United States Patent [19]

Buck

[11] Patent Number: 5,681,020
[45] Date of Patent: Oct. 28, 1997

[54] VERTICAL BLIND SUSPENSION UNITS

[75] Inventor: Alexander Hermann Buck, Protea Valley, South Africa

[73] Assignee: Exactocraft (Proprietary) Limited, Paardeneiland, South Africa

[21] Appl. No.: 467,168

[22] Filed: Jun. 6, 1995

[30] Foreign Application Priority Data

Jul. 15, 1994 [ZA] South Africa ............... 94/5180

[51] Int. Cl.$^6$ ...................................... F16B 45/00
[52] U.S. Cl. .................. 248/305; 160/178.1 V; 24/601.2; 24/716
[58] Field of Search ....................... 248/339, 304, 248/305; 160/178.1 V, 176.1 V, 900, 168.1 V; 16/87 R; 24/601.2, 716

[56] References Cited

U.S. PATENT DOCUMENTS 3,063,669  11/1962  Bell ........................ 248/304 X
4,617,704  10/1986  Kasai ...................... 24/601.2
4,967,823  11/1990  Gagnon .................... 160/900

FOREIGN PATENT DOCUMENTS 8400347  9/1985  Netherlands ............. 160/900
2157359  10/1985  United Kingdom ...... 24/601.2

*Primary Examiner*—Blair Johnson
*Attorney, Agent, or Firm*—Larson and Taylor

[57] ABSTRACT

A support hook for a vertical blind suspension unit which includes a shaft attachable or attached to a caller member for a vertical blind suspension unit; a hook formation provided at one end of the shaft, the hook formation including a first part extending away from the shaft at an angle thereto, and a second part extending away from the first part to define a gap between the second part and the shaft; and a bearing support surface on the first part in the gap for supposing a slat element, the bearing support surface having a peak between its ends.

3 Claims, 1 Drawing Sheet

VERTICAL BLIND SUSPENSION UNITS

FIELD OF INVENTION

The present invention relates to vertical blind suspension units.

More particularly, the invention relates to support hooks for vertical blind suspension units.

BACKGROUND TO INVENTION

Conventionally in vertical blind systems each louver blind includes a blind slat which is attached centrally at its top end to a carrier member, which is rotatably and slidably supported in a support track rail. Thereby each blind slat can be rotated about a vertical axis and be shifted sideways along the support rail.

Normally these suspension units include a carrier member, which suspends a vertical louver blind vane or slat from a support rail attached to a ceiling or a wall. The carrier member supports a shaft and a slat support connection or hook. Such slat connections or hooks do not always allow a slat to retain its vertical position through the whole turning movement.

It is an object of the invention to suggest an improved type of hook formation for a vertical suspension unit which will assist in overcoming this problem.

SUMMARY OF INVENTION

According to the invention, a support hook for a vertical blind suspension unit includes a) a shaft attachable at one end to a pivotable member associated with a carrier member for a vertical blind suspension unit;

b) a hook formation provided at an end of the shaft opposite to the end attachable to a pivotable member;

c) the hook formation including a first part extending away from the shaft at an angle thereto, and a second part extending away from the first part towards its end;

d) a gap defined between the second part and the shaft;

e) a bearing support surface on the first part located in the gap for supporting a slat, the bearing support surface having a peak between its ends for allowing a slat supported thereby to be pivoted in a first direction for vertical alignment of the slat; and f) the gap being of a size allowing free movement of a slat supported on the bearing support surface between the shaft and the second part for allowing pivotation of a slat in a second direction, which is substantially at right angles to the first direction.

The bearing support surface may be defined by two flat surfaces joined together in an inverted V-shape.

The two flat surfaces may define an obtuse angle between them.

BRIEF DESCRIPTION OF DRAWINGS

The invention will now be described by way of example with reference to the accompanying schematic drawings.

In the drawings there is shown in.

DETAILED DESCRIPTION OF DRAWINGS

Figure 1:
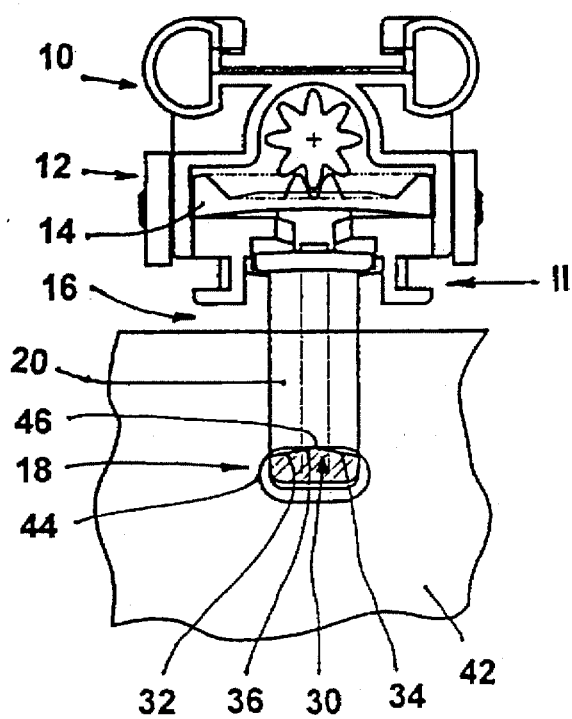
FIG. 1 a front view of a vertical blind suspension unit with a hook support in accordance with the invention.

Referring to the drawings, a suspension unit for vertical louver blinds, generally indicated by reference numeral 10, includes a carrier member 12, a pivotable member 14, a link shaft 16 and a universal slat connection 18.

The slat connection 18 includes a shaft 20 and a hook formation 22 defined by a first part 24 extending at right angles from the shaft 20 and a second part 26 extending in turn substantially at right angles from the first part 14. Between the shaft 20, the first part 24, and the second part 26 a gap 28 is defined.

The second part 26 has an upper slat bearing or support surface 30 which includes two flat side surface parts 32 and 34 joining together in an inverted V-shape up to a peak 36.

The universal slat connection 18 further includes a retention arm 38 which extends downwardly with a gap 40 on its inside relative to the second part 26 of the hook formation 22.

Figure 2:
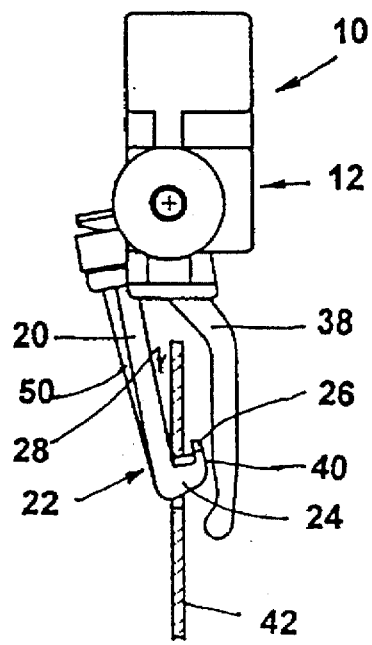
FIG. 2 a view seen along arrow II in FIG. 1.

In use a slat, e.g. a rigid type slat 42 having a rectangular hole 44 is inserted through the gap 40 so that it can be hooked onto the hook formation 22 as shown in FIG. 2. In this position the upper edge 46 of the hole 44 rests on the peak 36 as shown in FIG. 1.

The angle 48 (see FIG. 4) between the shaft 20 and the arm 38 and the width of the angle 48 must be dimensioned such to allow unrestricted movement of the slat 42 on rotation.

As is shown in FIG. 2, the arm 38 is not parallel with the shaft 20.

Figure 4:
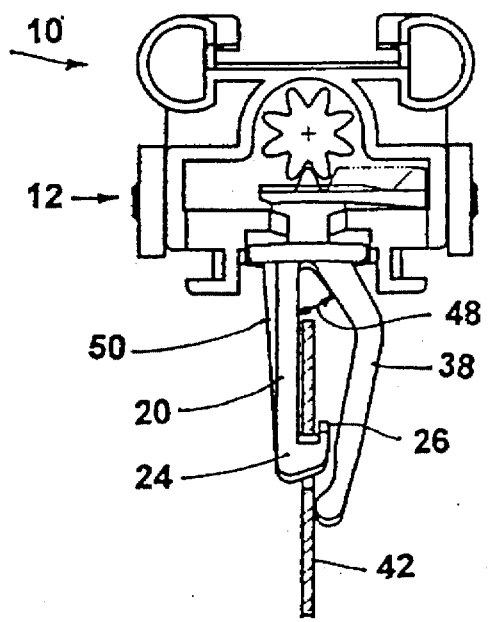
FIG. 4 a view seen along arrow IV in FIG. 3.
Figure 3:
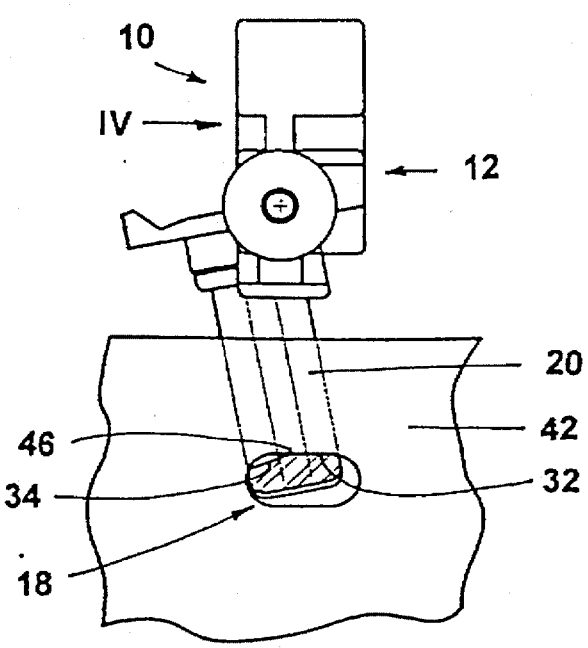
FIG. 3 a view corresponding to FIG. 2 but with the hook rotated through 90°.

When the shaft 20 is rotated-through 90° as shown in FIGS. 3 and 4 it is inclined to the vertical and in this position the edge 46, more particularly the left hand side of the edge 46, will move until in abutment with the surface part 32 as shown in FIG. 3. Accordingly the slat 42 will remain vertical throughout the rotation of the shaft 20. Thus a slat hooked into position in the hook as suggested retains its vertical position by way of self-alignment throughout the whole turning movement and the mass of the slat and the seating of the hook allow free movement to keep the slat vertical.

The gap 40 has a width which is less than thickness of the slat 42 to prevent the slat 42 from being pulled out easily.

The shaft 20 has a stiffener rib 50.

I claim:

1. A support hook for a vertical blind suspension unit, said support hook comprising:

a) a shaft attachable at one end to a pivotable member associated with a carrier member for a vertical blind suspension unit;

b) a hook formation provided at an end of the shaft opposite to said one end attachable to a pivotable member;

c) the hook formation including a first part extending away from the shaft at an angle thereto, and a second part extending away from the first part towards said one end;

d) a gap defined between the second part and the shaft;

e) a bearing support surface on the first part located in said gap for supporting a slat, the bearing support surface having ends and including a peak between said ends, and comprising a pair of inclined support surface parts each extending from a respective one of said ends to said peak;

f) said gap being of a size allowing free movement of a slat supported on the bearing support surface between the shaft and the second part; and g) a retention arm connected to said one end and extending along said shaft in opposed, spaced relation to said shaft.

2. A hook as claimed in claim 1, in which said support surface parts are defined by two flat surfaces joined together in an inverted V-shape.

3. A hook as claimed in claim 2 in which the two flat surfaces define an obtuse angle therebetween.

* * * * *